(12) United States Patent
Lim

(10) Patent No.: US 11,143,911 B2
(45) Date of Patent: Oct. 12, 2021

(54) COLOR CONVERSION SHEET, BACKLIGHT UNIT, AND DISPLAY DEVICE

(71) Applicant: LG DISPLAY CO., LTD., Seoul (KR)

(72) Inventor: KiSung Lim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/930,795

(22) Filed: Jul. 16, 2020

(65) Prior Publication Data
US 2021/0033926 A1 Feb. 4, 2021

(30) Foreign Application Priority Data
Jul. 30, 2019 (KR) .................. 10-2019-0092445

(51) Int. Cl.
*G02F 1/13357* (2006.01)
*G02F 1/1335* (2006.01)
*G02B 5/26* (2006.01)

(52) U.S. Cl.
CPC ......... *G02F 1/133603* (2013.01); *G02B 5/26* (2013.01); *G02F 1/133512* (2013.01); *G02F 1/133514* (2013.01); *G02F 1/133605* (2013.01); *G02F 1/133614* (2021.01); *G02F 1/133624* (2021.01); *G02F 1/133621* (2013.01)

(58) Field of Classification Search
None
See application file for complete search history.

(56) References Cited

U.S. PATENT DOCUMENTS

| | | | |
|---|---|---|---|
| 9,134,011 B2 * | 9/2015 | Jo | F21V 13/10 |
| 10,158,048 B2 * | 12/2018 | Kim | H01L 33/465 |
| 10,274,168 B2 * | 4/2019 | Tamura | G02F 1/133605 |
| 2011/0002140 A1 | 1/2011 | Tsukahara et al. | |
| 2018/0004041 A1 | 1/2018 | Shin et al. | |
| 2018/0252967 A1 * | 9/2018 | Li | G02B 6/0023 |
| 2018/0356682 A1 * | 12/2018 | Kang | G02F 1/133617 |
| 2019/0051484 A1 | 2/2019 | Nakamura et al. | |

* cited by examiner

*Primary Examiner* — Richard H Kim
(74) *Attorney, Agent, or Firm* — Birch, Stewart, Kolasch & Birch, LLP

(57) ABSTRACT

Embodiments of the present disclosure relate to a color conversion sheet, a backlight unit, and a display device, in which a color conversion sheet realizing white light from blue light includes a green reflection filter positioned between a green color conversion layer and a red color conversion layer, thereby independently exciting the green light and the red light and increasing the amount of green light supplied to the display panel while preventing the green light from being excited into red light. Therefore, it is possible to increase the brightness of white light supplied through the color conversion sheet and provide a backlight unit with improved luminance efficiency.

19 Claims, 17 Drawing Sheets

<First reflection filter : Spectrum EX2>

<First reflection filter : Spectrum EX3>

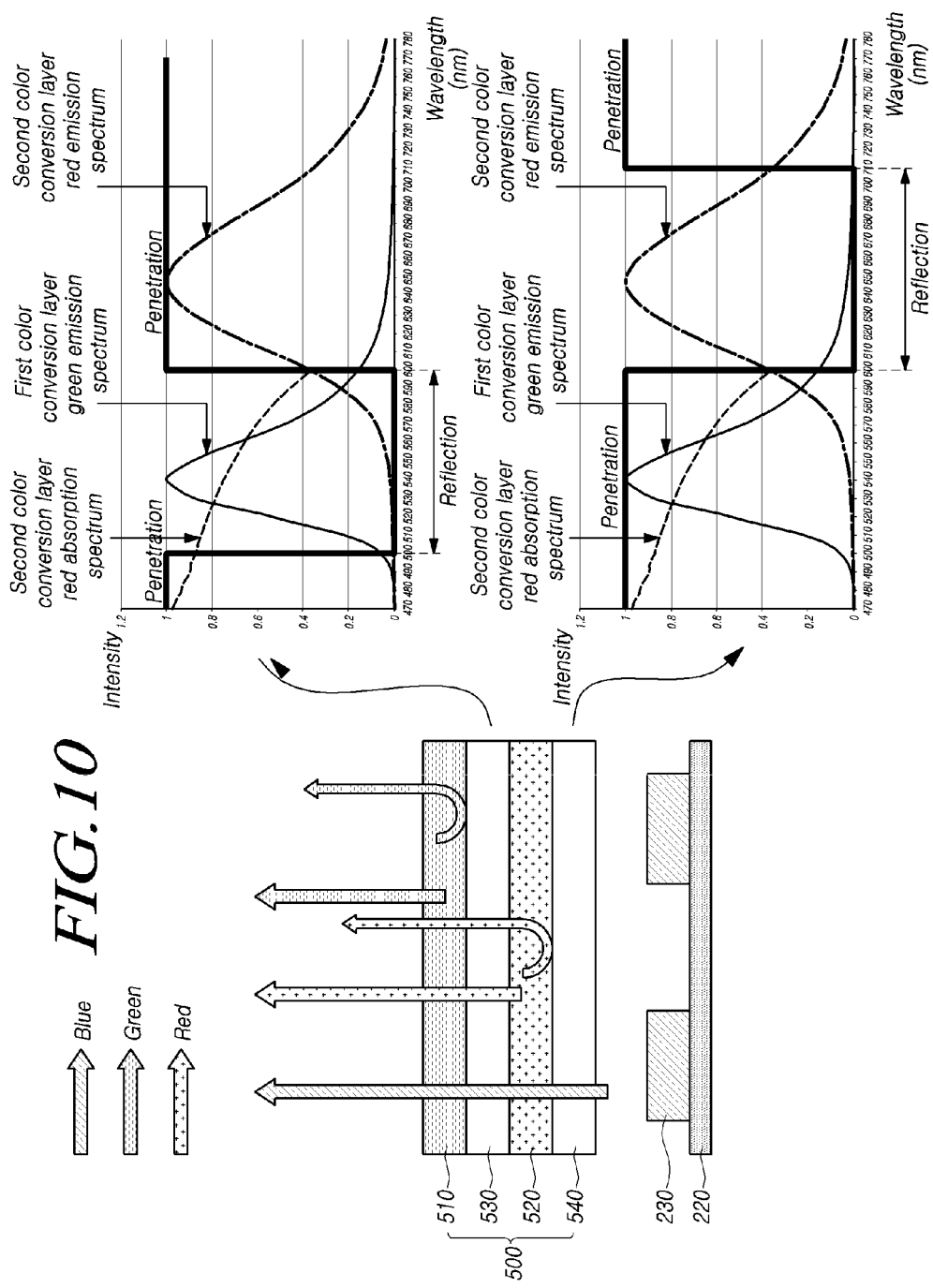

COLOR CONVERSION SHEET, BACKLIGHT UNIT, AND DISPLAY DEVICE

CROSS REFERENCE TO RELATED APPLICATION

This application claims priority to Korean Patent Application No. 10-2019-0092445, filed in the Republic of Korea on Jul. 30, 2019, the entire contents of which are hereby expressly incorporated by reference for all purposes as if fully set forth herein into the present application.

BACKGROUND

1. Field

Embodiments of the present disclosure relate to a color conversion sheet, a backlight unit, and a display device.

2. Description of Related Art

The advent of the information-based society has brought increasing demand for display devices for displaying images, and various types of display devices such as liquid crystal display devices, organic light-emitting display devices, and the like are being utilized.

The liquid crystal display device, among the above display devices, can include a display panel and a backlight unit for supplying light to the display panel. In addition, the backlight unit can include a light source that emits light and various optical members.

In this case, if the thickness of the backlight unit is reduced in order to reduce the thickness of the display device, there is a limitation in that the optical gap between the light source and the display panel may not be sufficiently secured, which degrades the image quality thereof. In addition, if the luminance efficiency of the backlight unit is not good, a high current needs to be applied to realize high brightness, which may increase power consumption and degrade the reliability of components.

Accordingly, a method capable of providing a backlight unit having improved image quality and luminance efficiency while reducing the thickness of the backlight unit is needed.

BRIEF SUMMARY

Embodiments of the present disclosure can provide a method capable of improving the image quality of a backlight unit while reducing the thickness of the backlight unit included in a display device.

Embodiments of the present disclosure can provide a backlight unit having improved luminance efficiency by a color conversion sheet capable of minimizing the loss of light in a majority wavelength band, among brightness components.

In an aspect, embodiments of the present disclosure can provide a display device including a display panel and a backlight unit for supplying light to the display panel.

The backlight unit can include a plurality of light sources emitting light in a first wavelength band; and a color conversion sheet arranged between the light sources and the display panel.

In addition, the color conversion sheet can include a first color conversion layer configured to react to light in a first wavelength band and emit light in a second wavelength band; and a second color conversion layer positioned between the light sources and the first color conversion layer and configured to react to light in at least a portion of the first wavelength band and the second wavelength band and emit light in a third wavelength band. In addition, the color conversion sheet can further include a first reflection filter positioned between the first color conversion layer and the second color conversion layer, and configured to separate the first color conversion layer from the second color conversion layer and to reflect light in at least a portion of the second wavelength band.

In this case, a peak wavelength in a spectrum of the light emitted from the first color conversion layer can be less than a peak wavelength in a spectrum of the light emitted from the second color conversion layer, and the first reflection filter can reflect the light in at least a portion of the wavelength band in which the wavelength band of the light absorbed by the second color conversion layer overlaps the second wavelength band.

In addition, the color conversion sheet can further include a second reflection filter positioned between the light sources and the second color conversion layer and configured to reflect light in the third wavelength band.

In another aspect, embodiments of the present disclosure can provide a color conversion sheet including a first color conversion layer configured to react to light in a first wavelength band and emit light in a second wavelength band; a second color conversion layer configured to react to light in at least a portion of the first wavelength band and the second wavelength band and emit light in a third wavelength band; and a reflection filter positioned between the first color conversion layer and the second color conversion layer, and configured to separate the first color conversion layer from the second color conversion layer and to reflect light in at least a portion of the second wavelength band.

According to embodiments of the present disclosure, it is possible to prevent the occurrence of hot spots and to improve the image quality of the backlight unit by arranging a light conversion pattern in the area between the light sources and various optical sheets so as to correspond to the light sources.

According to embodiments of the present disclosure, it is possible to minimize the loss of green light by preventing the green light obtained by exciting blue light from being excited into red light, thereby improving the luminance efficiency of the backlight unit.

BRIEF DESCRIPTION OF THE DRAWINGS

The above and other aspects, features and advantages of the present disclosure will be more apparent from the following detailed description taken in conjunction with the accompanying drawings, in which:

FIG. 10 is a diagram illustrating another example of the structure of a color conversion sheet included in a backlight unit according to embodiments of the present disclosure.

DETAILED DESCRIPTION

Figure 1:
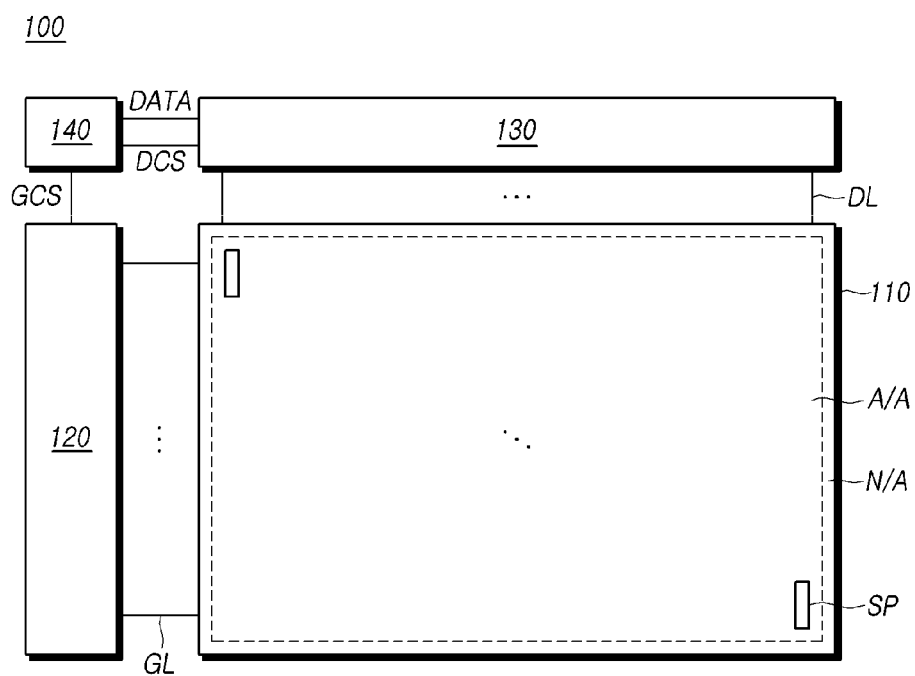
FIG. 1 is a diagram illustrating the schematic configuration of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

FIG. 1 is a diagram illustrating a schematic configuration of a display device 100 according to embodiments of the present disclosure. All the components of the display device according to all embodiments of the present disclosure are operatively coupled and configured.

Referring to FIG. 1, the display device 100 according to the embodiments of the present disclosure can include a display panel 110 including an active area (A/A) and a non-active area (N/A), and a gate driving circuit 120, a data driving circuit 130, and a controller 140 for driving the display panel 110.

A plurality of gate lines GL and a plurality of data lines DL are arranged on the display panel 110, and subpixels SP can be disposed in the areas where the gate lines GL and the data lines DL intersect each other.

The gate driving circuit 120 is controlled by the controller 140, and sequentially outputs scan signals to a plurality of gate lines GL arranged on the display panel 110, thereby controlling the driving timing of a plurality of subpixels SP.

The gate driving circuit 120 can include one or more gate driver integrated circuits (GDICs), and can be located only at one side of the display panel 110, or can be located at both sides thereof according to a driving method.

Each gate driver integrated circuit (GDIC) can be connected to a bonding pad of the display panel 110 by a tape automated bonding (TAB) method or a chip-on-glass (COG) method, or can be implemented by a gate-in-panel (GIP) method to then be directly arranged on the display panel 110. In some cases, the gate driver integrated circuit (GDIC) can be integrated and arranged on the display panel 110. In addition, each gate driver integrated circuit (GDIC) can be implemented by a chip-on-film (COF) method in which an element is mounted on a film connected to the display panel 110.

The data driving circuit 130 receives image data from the controller 140 and converts the image data into an analog data voltage. Then, the data driving circuit 130 outputs the data voltage to each data line DL according to the timing at which the scan signal is applied through the gate line GL so that each subpixel SP emits light having brightness according to the image data.

The data driving circuit 130 can include one or more source driver integrated circuits (SDICs).

Each source driver integrated circuit (SDIC) can include a shift register, a latch circuit, a digital-to-analog converter, an output buffer, and the like.

Each source driver integrated circuit (SDIC) can be connected to a bonding pad of the display panel 110 by a tape automated bonding (TAB) method or a chip-on-glass (COG) method, or can be directly disposed on the display panel 110. Alternatively, in some cases, the source driver integrated circuit (SDIC) can be integrated and arranged on the display panel 110. In addition, each source driver integrated circuit (SDIC) can be implemented by a chip-on-film (COF) method in which each source driver integrated circuit (SDIC) can be mounted on a film connected to the display panel 110, and can be electrically connected to the display panel 110 through wires on the film.

The controller 140 supplies various control signals to the gate driving circuit 120 and the data driving circuit 130, and controls the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 allows the gate driving circuit 120 to output a scan signal according to the timing implemented in each frame, and converts a data signal received from the outside to conform to the data signal format used in the data driving circuit 130 and then outputs the converted image data to the data driving circuit 130.

The controller 140 receives, from the outside (e.g., a host system), various timing signals including a vertical synchronization signal (VSYNC), a horizontal synchronization signal (HSYNC), an input data enable (DE) signal, a clock signal (CLK), and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 outputs various gate control signals GCS including a gate start pulse (GSP), a gate shift clock (GSC), a gate output enable signal (GOE), or the like.

In this case, the gate start pulse (GSP) controls operation start timing of one or more gate driver integrated circuits (GDICs) constituting the gate driving circuit 120. The gate shift clock (GSC), which is a clock signal commonly input to one or more gate driver integrated circuits (GDICs), controls the shift timing of a scan signal. The gate output enable signal (GOE) specifies timing information on one or more gate driver integrated circuits (GDICs).

In addition, in order to control the data driving circuit 130, the controller 140 outputs various data control signals DCS including a source start pulse (SSP), a source sampling clock (SSC), a source output enable signal (SOE), or the like.

In this case, the source start pulse (SSP) controls a data sampling start timing of one or more source driver integrated circuits (SDICs) constituting the data driving circuit 130. The source sampling clock (SSC) is a clock signal for controlling the timing of sampling data in the respective source driver integrated circuits (SDICs). The source output enable signal (SOE) controls the output timing of the data driving circuit 130.

The display device 100 can further include a power management integrated circuit for supplying various voltages or currents to the display panel 110, the gate driving circuit 120, the data driving circuit 130, and the like or controlling various voltages or currents to be supplied thereto.

Each subpixel SP can be an area defined by the intersection of the gate line GL and the data line DL, and a liquid crystal or a light-emitting element can be disposed therein depending on the type of the display device 100.

For example, in the case where the display device 100 is a liquid crystal display device, the display device 100 includes a light source such as a backlight unit for emitting light to the display panel 110, and a liquid crystal is disposed in the subpixel SP of the display panel 110. In addition, since the arrangement of the liquid crystal is adjusted by the electric field produced due to the data voltage applied to each subpixel SP, the brightness according to image data can be realized, thereby displaying images.

Figure 2:
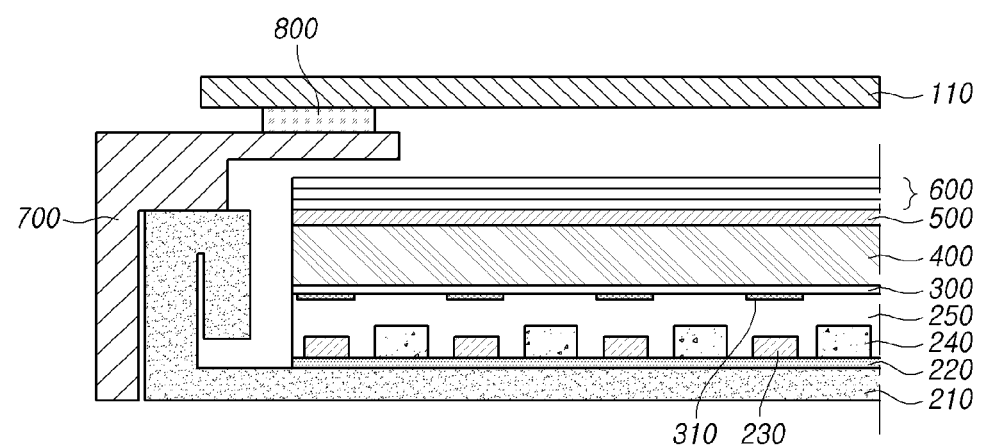
FIG. 2 is a diagram illustrating an example of the structure of a backlight unit included in a display device according to embodiments of the present disclosure.

FIG. 2 is a diagram illustrating an example of the structure of a backlight unit included in a display device 100 according to embodiments of the present disclosure.

Referring to FIG. 2, a display device 100 according to embodiments of the present disclosure can include a display panel 110 and a backlight unit disposed under the display panel 110 and supplying light to the display panel 110.

Various structures can be provided between the backlight unit and the display panel 110, and for example, the display panel 110 can be fixed to the backlight unit using a guide panel 700, a foam pad 800, and the like, but the disclosure is not limited thereto.

The backlight unit can include a cover bottom 210 for receiving optical elements and the like constituting the backlight unit.

A printed circuit 220 can be disposed on the cover bottom 210, and a plurality of light sources 230 can be arranged on the printed circuit 220.

The printed circuit 220 can be in the form of a substrate, and reflection plates 240 can be disposed in at least some of the areas in which the light sources 230 are not arranged on the printed circuit 220. For example, the reflection plate 240 can have a plurality of holes, and the light sources 230 can be disposed in the respective holes.

The light source protector 250 can be disposed on the plurality of light sources 230 and reflection plates 240. The light source protector 250 can protect the plurality of light sources 230, and can provide a function of diffusing the light emitted from the light sources 230. For example, the light source protector 250 can protect the light sources 230 and provide a light guide function while being in contact with the light sources 230.

A transparent film 300 can be disposed on the light source protector 250, and a plurality of light conversion patterns 310 can be arranged on the lower surface of the transparent film 300.

The plurality of light conversion patterns 310 can be light control patterns, and can be arranged on the lower surface of the transparent film 300 so as to correspond to the positions of the respective light sources 230. For example, the respective light conversion patterns 310 can be arranged to correspond to the holes formed in the reflection plate 240. In addition, in some cases, the area of the light conversion pattern 310 can be the same as the area of the hole in the reflection plate 240.

The light conversion pattern 310 can scatter, reflect, or diffract some of the light emitted in the vertical direction from the light source 230. In addition, the light conversion pattern 310 disposed in the transparent film 300 can allow some of the light emitted from the light source 230 to pass therethrough. In addition, the light conversion pattern 310 can be a light control pattern allowing some of the light to pass therethrough.

For example, the light conversion patterns 310 can be disposed in the area exhibiting the highest intensity of light emitted from the light source 230, thereby reducing the difference in brightness between the area in which the light source 230 is disposed (an area having a large amount of light) and the area between the light sources 230 (an area having a small amount of light) and the like.

A diffuser plate 400 can be disposed on the transparent film 300 in order to diffuse the light incident from the bottom thereof.

In addition, a color conversion sheet 500 or one or more optical sheets 600 can be disposed on the diffuser plate 400.

FIGS. 3A to 3E are diagrams illustrating an example of the detailed structure of the backlight unit shown in FIG. 2.

Figure 3A:
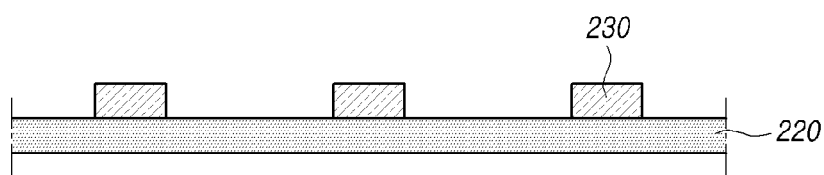
FIGS. 3A to 3E are diagrams illustrating an example of the detailed structure of the backlight unit shown in FIG. 2.

Referring to FIG. 3A, a plurality of light sources 230 is arranged on the printed circuit 220.

The light source 230, for example, can be a light-emitting diode (LED), a compact mini light-emitting diode (Mini LED), or an ultra-compact micro light-emitting diode (µLED). Therefore, the light source 230 in the form of a chip is able to be mounted on the printed circuit 220, thereby reducing the thickness of the backlight unit.

In addition, the light source 230 can emit white light, or in some cases, can emit light in a specific wavelength band (e.g., a wavelength band of blue light).

Figure 3B:
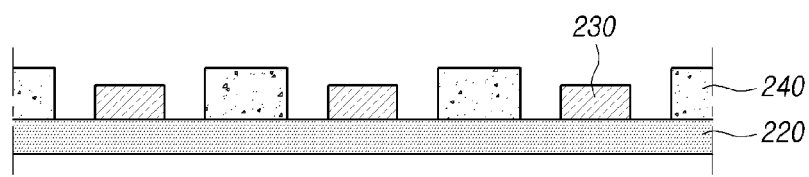

Referring to FIG. 3B, the reflection plates 240 can be arranged in at least some of the areas on the printed circuit 220, excluding the areas in which the light sources 230 are arranged.

The reflection plate 240 can be made to have openings (e.g., holes) formed in areas corresponding to the light sources 230, and can then be placed on the printed circuit 220. In addition, the reflection plate 240 can reflect the light emitted from the light source 230 toward the front of the backlight unit, thereby increasing the luminance efficiency of the backlight unit.

Since the light source 230 has a small size in the case where the light source 230 is provided in the form of a chip, the height of the reflection plate 240 can be greater than the height of the light source 230. For example, the upper surface of the reflection plate 240 can be positioned higher than the upper end of the light source 230.

Accordingly, the light emitted in the lateral direction of the light source 230 can be reflected by the side surface of the reflection plate 240 to then travel to the front of the backlight unit, thereby further improving the luminance efficiency of the backlight unit.

In addition, in some cases, a reflection film can be coated on the printed circuit 220.

For example, a reflection film can be coated on the front surface of the printed circuit 220 or in areas excluding the areas in which the light sources 230 are arranged, thereby increasing the luminance efficiency.

In this case, the reflection film coated on the printed circuit 220 can replace the reflection plate 240 by performing the functions thereof, or can be provided together with the reflection plate 240 to together provide a reflecting function.

Figure 3C:
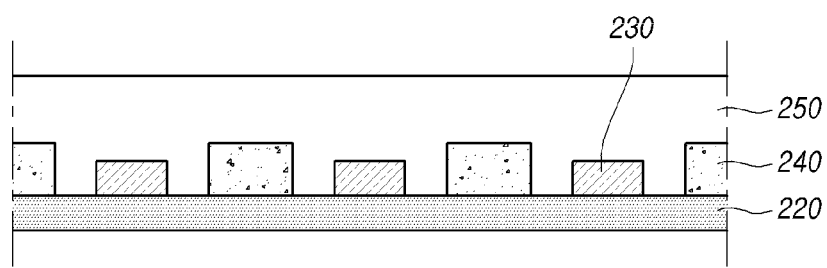

Referring to FIG. 3C, the light source protector 250 can be disposed on a plurality of light sources 230 and reflection plates 240.

The light source protector 250 can be formed of, for example, a resin.

In the case where the light source protector 250 is formed of a resin, partitions can be disposed at the outside of the printed circuit 220 or in the area outside the area in which a plurality of light sources 230 is arranged on the printed circuit 220, and a resin can be coated inside the partitions, thereby forming the light source protector 250.

The light source protector 250 can perform a function of protecting the plurality of light sources 230 arranged on the printed circuit 220, and can provide a light guide function of diffusing the light emitted from the light source 230.

For example, the light emitted from the light source 230 can be spread evenly over the upper surface of the light source protector 250 by the light source protector 250.

Embodiments of the present disclosure are able to further improve the uniformity of images while reducing the thickness of the backlight unit by providing the light conversion patterns 310 to positions on the light source protector 250 so as to correspond to the light sources 230.

Figure 3D:
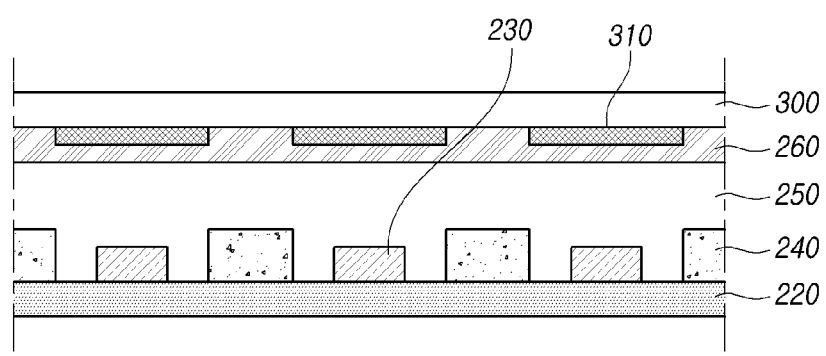

Referring to FIG. 3D, a transparent film 300 can be disposed on the light source protector 250, and a plurality of light conversion patterns 310 can be arranged on the lower surface of the transparent film 300, but the disclosure is not limited thereto, and a plurality of conversion patterns 310 can be arranged on the upper surface of the transparent film 300. In addition, the transparent film 300 can be bonded onto the light source protector 250 through an adhesive layer 260. The adhesive layer 260 can be an optically clear adhesive (OCA). The transparent film 300 can be formed of, for example, PET or the like, but the disclosure is not limited thereto.

Respective ones of the plurality of light conversion patterns 310 disposed on the lower surface of the transparent film 300 can be arranged to correspond to respective ones of the plurality of light sources 230 disposed on the printed circuit 220.

For example, the light conversion patterns 310 can be arranged to overlap, at least in part, the light sources 230, and can be arranged to overlap the areas including the areas in which the light sources 230 are arranged in consideration of diffusion characteristics of light.

The light conversion pattern 310 can have constant reflectivity, and can scatter, reflect, diffract, or transmit some of the light emitted from the light source 230.

For example, the light conversion patterns 310 can scatter the light emitted from the light sources 230 such that the light travels in the vertical direction and in the diagonal direction. Alternatively, the light conversion patterns 310 can reflect the light emitted from the light sources 230, and can allow the same to be reflected again by the reflection plates 240 so that the light travels through the area between the light sources 230.

As described above, the light conversion patterns 310 can adjust the emission direction of the light emitted from the light sources 230, thereby improving the image quality of the backlight unit. For example, the light emitted from the light sources 230 can be scattered, reflected, diffracted, or transmitted by the light conversion patterns 310, thereby improving the brightness uniformity of the backlight unit.

Figure 3E:
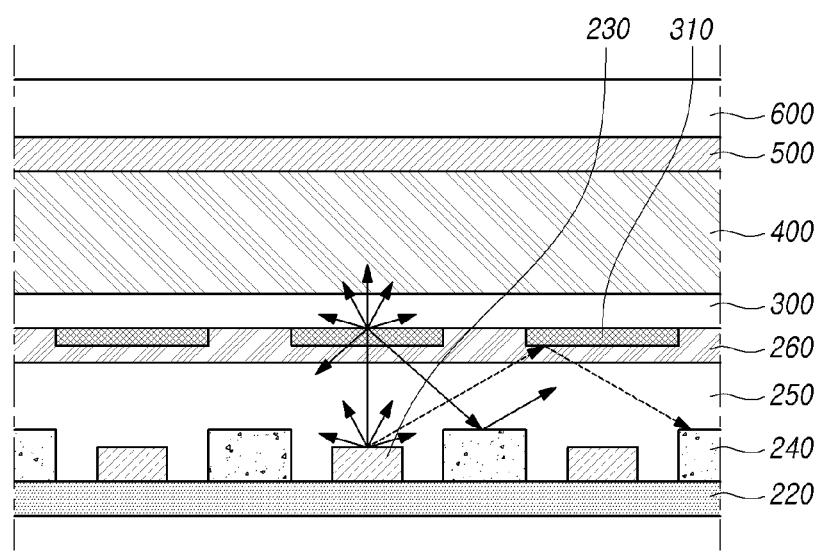

Referring to FIG. 3E, a diffuser plate 400 can be disposed on the transparent film 300, and a color conversion sheet 500 can be disposed on the diffuser plate 400. In addition, one or more optical sheets 600 can be disposed on the color conversion sheet 500.

In this case, the sequence in which the diffuser plate 400 and the color conversion sheet 500 are disposed can be changed. The diffuser plate 400 diffuses the light emitted through the transparent film 300.

The color conversion sheet 500 can react to the incident light, thereby emitting light in a specific wavelength band.

For example, in the case where the light source 230 emits light in a first wavelength band (e.g., blue light), the color conversion sheet 500 can react to the incident light to then emit light in a second wavelength band (e.g., green light) and light in a third wavelength band (e.g., red light).

In some cases, the color conversion sheet 500 can be disposed only in a portion of the diffuser plate 400.

For example, in the case where the light source 230 emits blue light, the color conversion sheets 500 can be disposed only in areas excluding the areas corresponding to the areas in which blue subpixels SP are arranged on the display panel 110. For example, the light that has not passed through the color conversion sheet 500 can reach the blue subpixel SP of the display panel 110.

The color conversion sheet 500 may not be provided depending on the light sources 230.

For example, in the case where the light source 230 emits white light, or in the case where a color conversion film for releasing green light and red light is coated on the emission surface of the light source 230 that emits blue light, the color conversion sheet 500 may not be provided.

As described above, embodiments of the present disclosure can provide a backlight unit that includes a transparent film 300 including light conversion patterns 310 arranged at positions corresponding to the light sources 230 and a plurality of optical elements, thereby satisfying image quality while reducing the thickness of the backlight unit.

Hereinafter, the embodiments of the present disclosure will be described along with a detailed example of the light conversion pattern 310 disposed on the transparent film 300.

Figure 4:
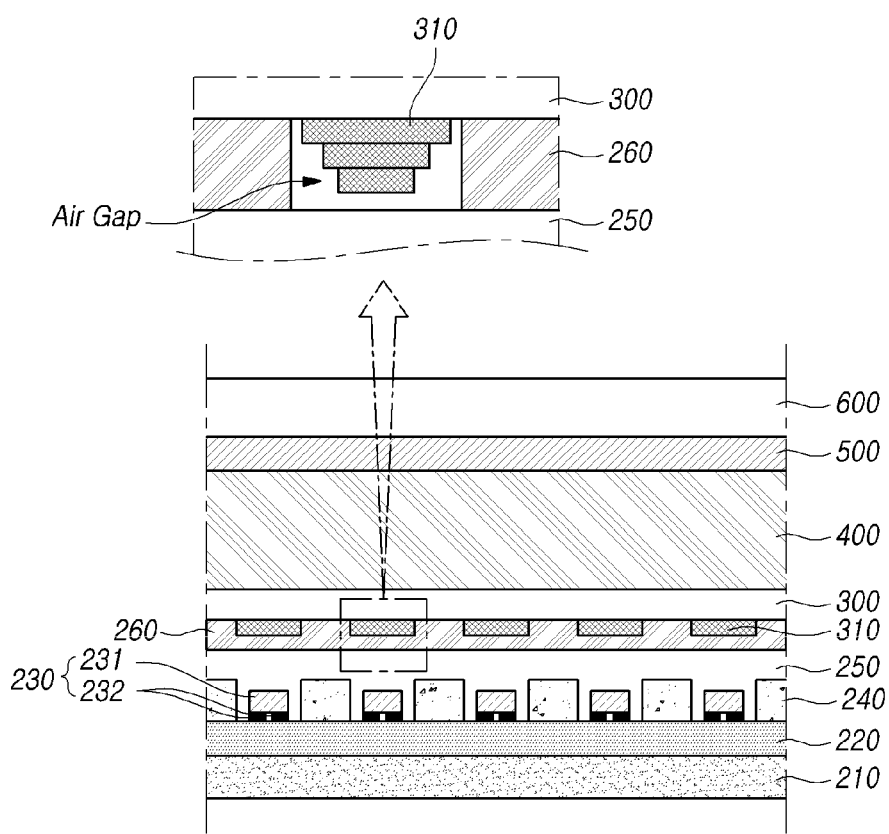
FIG. 4 is a diagram illustrating an example of the structure of a light conversion pattern included in a backlight unit according to embodiments of the present disclosure.

FIG. 4 is a diagram illustrating an example of the structure of a light conversion pattern 310 included in a backlight unit according to embodiments of the present disclosure.

Referring to FIG. 4, a printed circuit 220 can be disposed on a cover bottom 210, and the printed circuit 220, for example, can be bonded onto the cover bottom 210 by an adhesive tape interposed between the cover bottom 210 and the printed circuit 220.

A plurality of light sources 230 can be arranged on the printed circuit 220, and reflection plates 240 can be arranged in at least some of the areas, excluding the areas in which the light sources 230 are arranged on the printed circuit 220.

The light source 230, for example, can be a light-emitting diode (LED), and can include a light-emitting portion 231 including an n-type semiconductor layer, an activation layer, and a p-type semiconductor layer, and an electrode portion 232.

A light source protector 250 is disposed on the plurality of light sources 230 and reflection plates 240.

A transparent film 300 can be disposed on the light source protector 250, and light conversion patterns 310 can be arranged on the lower surface of the transparent film 300 so as to correspond to the positions of the light sources 230. In addition, a diffuser plate 400, a color conversion sheet 500, and an optical sheet 600 can be disposed on the transparent film 300.

The light conversion patterns 310 arranged on the lower surface of the transparent film 300 can be implemented by printing a material having a light-blocking property on the transparent film 300, and, for example, the light conversion patterns 310 can be provided by a method of printing $TiO_2$ ink on the transparent film 300. If a single layer of the light conversion pattern 310 is formed of $TiO_2$, the reflectivity thereof can be 60 to 70%. In addition, the absorptivity/transmissivity thereof can be 30 to 40%.

In addition, the light conversion patterns 310 can be arranged in a single-layered structure or a multi-layered structure on the lower surface of the transparent film 300. For example, the light conversion patterns 310 can be arranged in two layers, and in the case where the light conversion pattern 310 is arranged in two layers, the reflectivity thereof can be 70 to 80%. In addition, the absorptivity/transmissivity thereof can be 20 to 30%. However, the reflectivity of the light conversion pattern 310 is not limited thereto, and if the content of the titanium dioxide ($TiO_2$) contained in the light conversion pattern 310 increases, or if the thickness of the layer of the light conversion pattern 310 increases, the reflectivity of the light conversion pattern 310 increases while the transmissivity thereof is reduced.

In addition, in some cases, as shown in FIG. 4, the light conversion pattern 310 disposed on the lower surface of the transparent film 300 can include three layers.

The above light conversion pattern 310 can be implemented by a method of printing a light-blocking material three times on the transparent film 300, and the area of the printed light-blocking material can be gradually reduced. In addition, the transparent film 300 in which the light conversion patterns 310 are arranged can be placed, in an inverted state, on the light source protector 250, so that the light conversion patterns 310 can be arranged on the light sources 230.

Accordingly, the area of the light conversion pattern 310 can be reduced moving downwards from the transparent film 300, and the thickness of the central area of the light conversion pattern 310 can be greater than the thickness of the peripheral area.

For example, since the light emitted from the light source 230 in the vertical direction has the highest intensity, the central area of the light conversion pattern 310 can be formed to be thicker.

As described above, the light conversion patterns 310 arranged on the light sources 230 can block the light emitted from the light sources 230 in the vertical direction, thereby preventing hot spots from occurring in the areas in which the light sources 230 are arranged.

The transparent film 300 on which the light conversion patterns 310 are arranged can be bonded onto the light source protector 250 using an adhesive layer 260.

In this case, the adhesive layer 260 can be provided in at least some of the areas on the lower surface of the transparent film 300, excluding the areas in which the light conversion patterns 310 are arranged.

Accordingly, the adhesive layer 260 may not be provided in the areas in which the light conversion patterns 310 are arranged, and an air gap can be provided between the light conversion pattern 310 and the light source protector 250.

In addition, the side surface of the light conversion pattern 310 and the adhesive layer 260 can be spaced apart from each other.

Since the air gap is provided between the light conversion pattern 310 and the light source protector 250, the light emitted in the lateral direction of the light conversion pattern 310 can be reflected by the air gap.

For example, the light emitted in the lateral direction of the light conversion pattern 310 can travel at a large refractive angle due to the air layer having a low refractivity, or can be reflected from the air layer. In addition, the light reflected from the air layer is reflected and emitted again by the reflection plate 240, thereby improving luminance efficiency while assisting the light blocking function of the light conversion pattern 310.

As described above, it is possible to improve luminance efficiency of the backlight unit while preventing the occurrence of hot spots through a structure in which the light conversion pattern 310 and the air gap are provided at positions corresponding to the light sources 230.

In this case, the light conversion patterns 310 arranged on the lower surface of the transparent film 300 can be disposed in different structures depending on the arrangement positions.

Figure 5A:
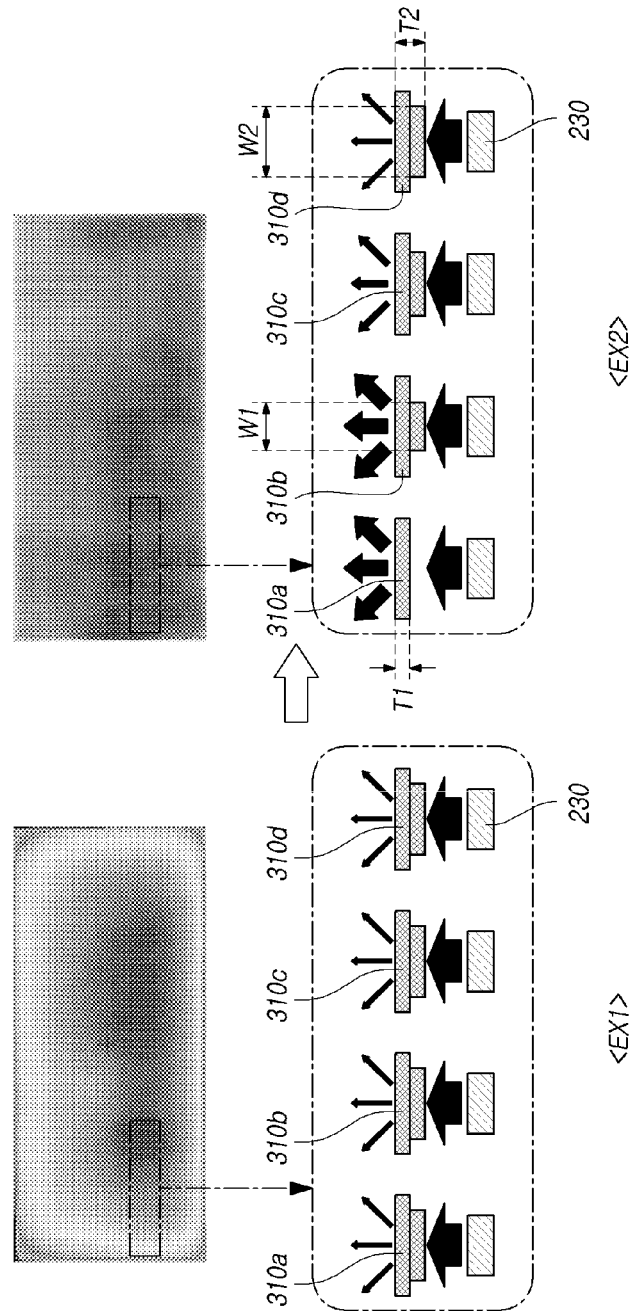
FIGS. 5A and 5B are diagrams illustrating an example of the structure depending on the arrangement positions of light conversion patterns included in a backlight unit according to embodiments of the present disclosure.
Figure 5B:
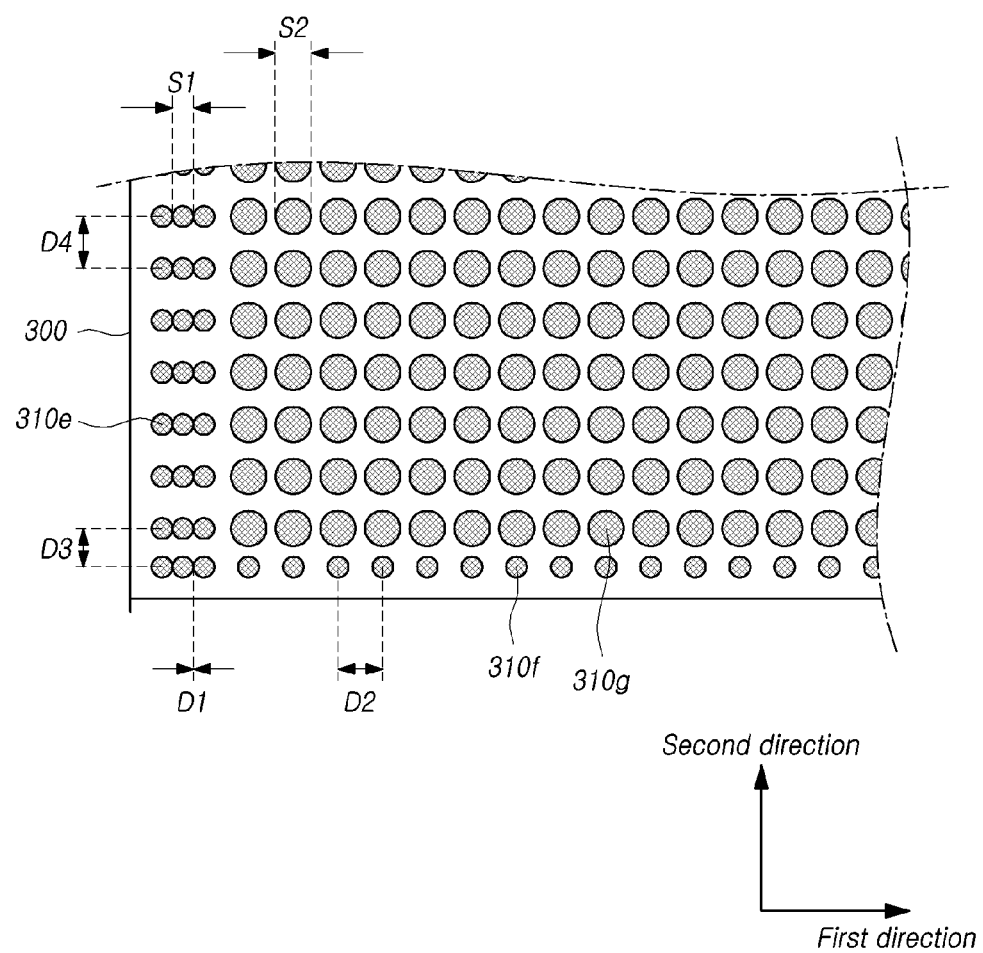

FIGS. 5A and 5B are diagrams illustrating an example of the structure depending on the arrangement positions of light conversion patterns 310 included in a backlight unit according to embodiments of the present disclosure.

FIG. 5A illustrates an example of the brightness provided by the backlight unit depending on the structures of the light conversion patterns 310, in which EX1 shows an example of the measured brightness in the case where the light conversion patterns 310 are arranged in a specific structure and EX2 shows an example of the measured brightness in the case where the light conversion patterns 310 are arranged in different structures according to the positions thereof.

As shown in EX1 of FIG. 5A, if the structure of the light conversion pattern 310a disposed in the peripheral area of the backlight unit is the same as the structure of the light conversion pattern 310d disposed in the central area thereof, the brightness in the peripheral area of the backlight unit can be low.

For example, since the peripheral area of the backlight unit has a relatively small number of light sources 230 supplying light thereto, if light conversion patterns 310 having the same light blocking capability are arranged, the brightness in the peripheral area of the backlight unit can be lower than that of the central area of the backlight unit.

Accordingly, as shown in EX2 of FIG. 5A, the light conversion pattern 310a disposed in the peripheral area of the backlight unit and the light conversion pattern 310d disposed in the central area thereof can be configured to have different structures, thereby preventing degradation of the brightness in the peripheral area of the backlight unit and providing uniform brightness over the entire backlight unit.

For example, the light conversion patterns 310 can be configured such that the thickness T1 of the light conversion pattern 310a disposed in the peripheral area of the backlight unit is smaller than the thickness T2 of the light conversion pattern 310d disposed in the central area thereof.

Alternatively, the light conversion patterns 310 can be configured such that the area W1 of the thickest portion in the light conversion pattern 310b disposed adjacent to the peripheral area of the backlight unit is smaller than the area W2 of the thickest portion in the light conversion pattern 310d. For example, the portion of the light conversion pattern 310a, disposed in the peripheral area of the backlight unit and the light conversion pattern 310b adjacent to the peripheral area, that exhibits high blocking capability can have a small area.

In addition, the light conversion patterns 310 can be arranged such that the thickness of the light conversion pattern 310 gradually decreases or such that the area of the thickest portion of the light conversion pattern 310 gradually decreases moving from the central area to the peripheral area of the backlight unit.

In addition, in some cases, the light conversion patterns 310 can be arranged to be different in such a manner that the number of light sources 230 or the distance between the light sources 230 are different between the central area and the peripheral area of the backlight unit.

Referring to FIG. 5B, another example of the structure in which the light conversion patterns 310 are arranged on the lower surface of the transparent film 300 is illustrated.

In FIG. 5B, the distance between the light sources 230 disposed in the peripheral area of the backlight unit can be less than the distance between the light sources 230 disposed in the central area of the backlight unit. For example, the light sources 230 can be arranged to be denser in the peripheral area of the backlight unit so that the brightness is uniform between the central area and the peripheral area of the backlight unit.

In addition, since the light conversion patterns 310 are arranged on the lower surface of the transparent film 300 so as to correspond to the light sources 230, the distance between the light conversion patterns 310 disposed in the peripheral area of the backlight unit can be different from the distance between the light conversion patterns 310 disposed in the central area of the backlight unit.

For example, the distance D1 between the light conversion patterns 310, in a first direction, disposed in the peripheral area of the backlight unit can be smaller than the distance D2 between the light conversion patterns 310, in the first direction, disposed in the central area thereof. In addition, the distance D3 between the light conversion patterns 310, in a second direction, disposed in the peripheral area of the backlight unit can be smaller than the distance D4 between the light conversion patterns 310, in the second direction, disposed in the central area thereof.

In this case, the size, the thickness, or the like of the light conversion pattern 310 disposed in the peripheral area of the backlight unit can be different from the size, the thickness, or the like of the light conversion pattern 310 disposed in the central area of the backlight unit.

For example, as shown in FIG. 5B, the size S1 of the light conversion patterns 310e and 310f disposed in the peripheral area of the backlight unit can be smaller than the size S2 of the light conversion pattern 310g disposed in the central area of the backlight unit.

Alternatively, the light conversion pattern 310 can have a multi-layer structure as described above, and in this case, the thicknesses of the light conversion patterns 310e and 310f disposed in the peripheral area of the backlight unit or the area of the thickest portion thereof can be smaller than the thickness of the light conversion pattern 310g disposed in the central area of the backlight unit or the area of the thickest portion thereof.

For example, since the light conversion patterns 310e and 310f disposed in the peripheral area of the backlight unit have small sizes, the light conversion patterns can be arranged to correspond to the light sources 230 arranged at narrow intervals. Accordingly, it is possible to prevent hot spots from occurring at the positions corresponding to the light sources 230 in the peripheral area of the backlight unit.

In addition, it is possible to increase the amount of emitted light and to prevent degradation of brightness in the peripheral area of the backlight unit by reducing the degree of blocking of the light emitted from the light source 230 in the peripheral area of the backlight unit, thereby providing uniform brightness over the entire area of the backlight unit.

As described above, it is possible to prevent degradation of brightness in the peripheral area of the backlight unit and to improve the uniformity of brightness by configuring the structure of the light conversion pattern 310 to be different for respective areas of the backlight unit.

In addition, it is possible to prevent hot spots in the backlight unit and improve the uniformity of brightness through the structure in which the light conversion patterns 310 are arranged as described above.

In addition, embodiments of the present disclosure can prevent the light loss caused in the case where the light emitted from the light source 230 is excited by the color conversion sheet 500, thereby providing a backlight unit with improved luminance efficiency.

Figure 6:
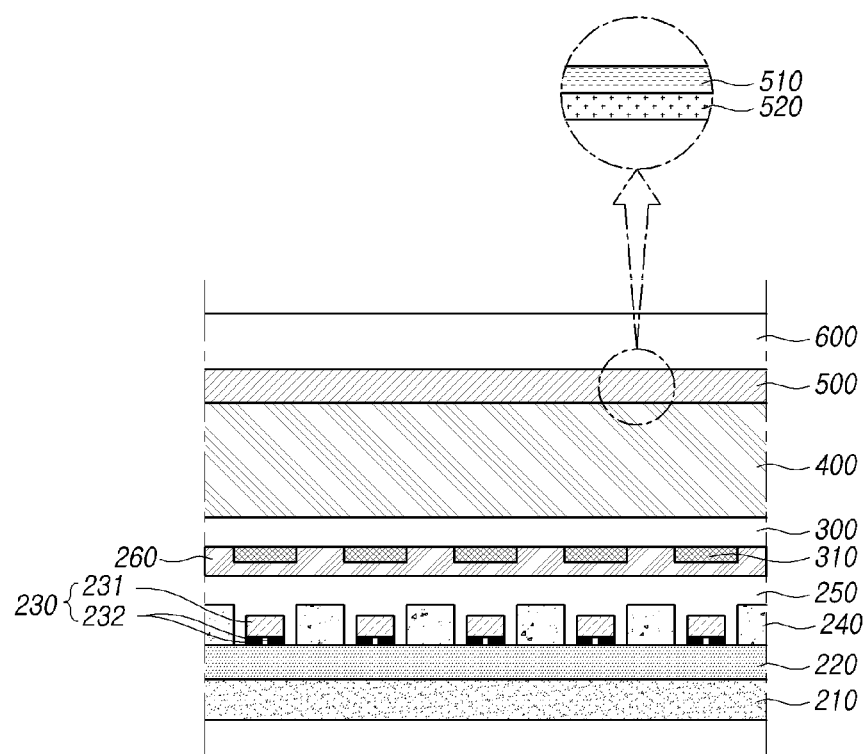
FIG. 6 is a diagram illustrating an example of the structure of a color conversion sheet included in a backlight unit according to embodiments of the present disclosure.

FIG. 6 is a diagram illustrating an example of the structure of a color conversion sheet 500 included in a backlight unit according to embodiments of the present disclosure.

Referring to FIG. 6, the light source 230 included in the backlight unit, for example, can emit light in a first wavelength band, and the light in the first wavelength band can be blue light. In addition, the light emitted from the light source 230 can be uniformly supplied to the upper part of the backlight unit by the reflection plate 240, the light source protector 250, the light conversion patterns 310, and the like.

The blue light supplied to the upper part of the backlight unit can be excited by the color conversion sheet 500. The color conversion sheet 500 can be positioned on the transparent film 300 in which the light conversion patterns 310 are arranged, and in some cases, the color conversion sheet 500 can be disposed on the diffuser plate 400, or can be disposed under the diffuser plate 400.

The above color conversion sheet 500 can excite light in a first wavelength band to thus release light in a second wavelength band and light in a third wavelength band, the light in the second wavelength band can be green light, and the light in the third wavelength band can be red light.

For example, the color conversion sheet 500 can include a color conversion material such as a phosphor that excites blue light into green light and a phosphor that excites blue light into red light. In addition, the color conversion sheet 500 can include a scattering agent, in addition to the color conversion material.

Blue light can be excited into green light and red light by the color conversion sheet 500, thereby supplying white light to the outside of the color conversion sheet 500.

In this case, the color conversion sheet 500 can include a first color conversion layer 510 that excites blue light into green light and a second color conversion layer 520 that excites blue light into red light. In addition, the first color conversion layer 510 and the second color conversion layer 520 can be arranged to be distinct from each other, and, for example, the second color conversion layer 520 can be disposed under the first color conversion layer 510. For example, the second color conversion layer 520 can be positioned between the light source 230 and the first color conversion layer 510.

The first color conversion layer 510 and the second color conversion layer 520 can be disposed in direct contact with each other, or a thin and transparent film or an adhesive material can be interposed between the first color conversion layer 510 and the second color conversion layer 520, thereby forming the color conversion sheet 500 including the first color conversion layer 510 and the second color conversion layer 520.

According to the arrangement of the color conversion sheet 500 described above, blue light emitted from the light source 230 preferentially passes through the second color conversion layer 520 disposed at the lower portion of the color conversion sheet 500. Accordingly, some of the blue light is excited by the second color conversion layer 520, so that red light can be emitted from the second color conversion layer 520.

In addition, some of the blue light passing through the second color conversion layer 520 is excited by the first color conversion layer 510, so that green light can be emitted from the first color conversion layer 510.

Since the red light (having a long wavelength) emitted from the second color conversion layer 520 is not excited into green light (having a short wavelength), the red light can pass through the first color conversion layer 510 to travel upwards from the first color conversion layer 510. For example, light having a short wavelength with high energy can be excited into light having a long wavelength with low energy, whereas light having a long wavelength with low energy is unable to be excited into light having a short wavelength with high energy. Accordingly, the second color conversion layer 520 can absorb blue light or green light having shorter wavelengths than red light to thus release red light. In addition, the first color conversion layer 510 can absorb blue light having a shorter wavelength than green light to thus release green light. As described above, since red light having a long wavelength is not absorbed by the first color conversion layer 510, the red light can pass through the first color conversion layer 510 and travel toward the outside thereof. In addition, since the green light can be emitted in all directions from the first color conversion layer 510, in some cases, some of the green light emitted by the first color conversion layer 510 can reach the second color conversion layer 520. If the green light emitted from the first color conversion layer 510 reaches the second color conversion layer 520, the green light can be excited into red light having a longer wavelength than the green light. However, since the first color conversion layer 510 is positioned on the second color conversion layer 520, it is possible to reduce the excitation of the green light emitted from the first color conversion layer 510 into the red light by the second color conversion layer 520.

Accordingly, it is possible to increase the brightness of the backlight unit and improve luminance efficiency thereof by reducing the loss of green light in the structure in which white light is supplied by exciting green light and red light using blue light.

In addition, it is possible to prevent the green light emitted backwards from the first color conversion layer 510 from being excited into red light by the second color conversion layer 520 by interposing a reflection filter for reflecting light in a specific wavelength band between the first color conversion layer 510 and the second color conversion layer 520.

Figure 7:
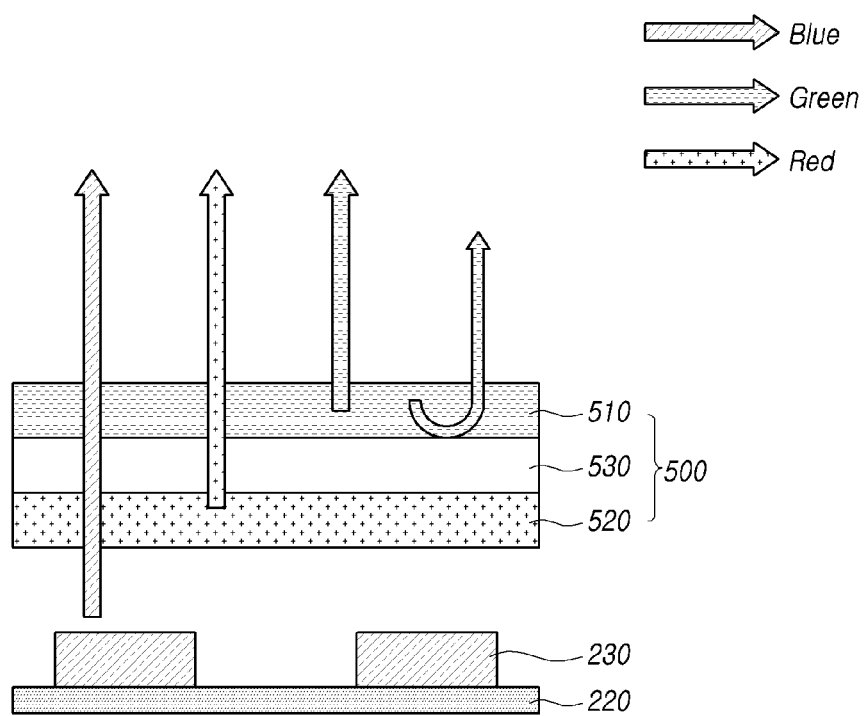
FIG. 7 is a diagram illustrating another example of the structure of a color conversion sheet included in a backlight unit according to embodiments of the present disclosure.

FIG. 7 is a diagram illustrating another example of the structure of a color conversion sheet 500 included in a backlight unit according to embodiments of the present disclosure.

Referring to FIG. 7, a light source 230 disposed on a printed circuit 220 emits blue light, and the blue light emitted from the light source 230 is excited by a color conversion sheet 500 into white light that is supplied to a display panel 110.

The color conversion sheet 500 can include a first color conversion layer 510 that reacts to blue light, thereby emitting green light, and a second color conversion layer 520 that is positioned between the light source 230 and the first color conversion layer 510 and reacts to blue light and green light, thereby emitting red light.

In addition, the color conversion sheet 500 can include a first reflection filter 530 that is positioned between the first color conversion layer 510 and the second color conversion layer 520 so as to separate the first color conversion layer 510 and the second color conversion layer 520 from each other and reflects green light.

The first reflection filter 530 can reflect light in at least a portion of the wavelength band of the green light. In addition, the first reflection filter 530 can allow light in wavelength bands excluding the wavelength band of green light to pass therethrough. For example, the first reflection filter 530 can transmit blue light and red light therethrough.

As described above, since the first color conversion layer 510 and the second color conversion layer 520 are separated by the first reflection filter 530, the excitation of green light and the excitation of red light can be independently performed.

In addition, since the first reflection filter 530 reflects green light, the green light emitted backwards from the first color conversion layer 510 can be reflected by the first reflection filter 530. For example, the green light emitted from the first color conversion layer 510 toward the light source 230 can be reflected by the first reflection filter 530 interposed between the first color conversion layer 510 and the light source 230.

In this case, since the first reflection filter 530 is interposed between the first color conversion layer 510 and the second color conversion layer 520, the green light excited by the first color conversion layer 510 is unable to reach the second color conversion layer 520. Accordingly, it is possible to prevent the loss of green light caused in the case where the green light that has been excited by the first color conversion layer 510 is excited by the second color conversion layer 520. In addition, red light, green light, and blue light can be emitted by preventing the loss of green light, thereby supplying white light to the display panel 110 while increasing luminance efficiency.

Specifically, some of the blue light emitted from the light source 230 is not excited by the first color conversion layer 510 and the second color conversion layer 520, and this blue light travels to the outside of the color conversion sheet 500. In this case, since the first reflection filter 530 allows blue light to pass therethrough, the blue light emitted from the light source 230 is not blocked by the first reflection filter 530.

In addition, the red light obtained by exciting the blue light emitted from the light source 230 using the second color conversion layer 520 can travel to the outside of the color conversion sheet 500. Since the first reflection filter 530 transmits red light therethrough, the red light emitted from the second color conversion layer 520 can travel to the outside of the color conversion sheet 500 without being blocked by the first reflection filter 530. In addition, the first color conversion layer 510 absorbs blue light having a short wavelength and then releases green light having a long wavelength. Accordingly, since the red light emitted from the second color conversion layer 520 is of a longer wavelength than the green light, the excited red light can travel to the outside of the first color conversion layer 510 without being excited into green light by the first color conversion layer 510.

The green light excited by the first color conversion layer 510, among the blue light emitted from the light source 230, can travel to the outside of the color conversion sheet 500.

In this case, the green light emitted backwards from the first color conversion layer 510 can be reflected by the first reflection filter 530 to then travel to the outside of the color conversion sheet 500.

Accordingly, it is possible to prevent the loss of green light, which is caused when the excited green light is excited into red light by the first color conversion layer 510, so that the green light can be emitted from the color conversion sheet 500.

As described above, red light, green light, and blue light can be emitted from the color conversion sheet 500, and white light can be emitted while reducing the loss of green light, thereby supplying light having high brightness to the display panel 110. Accordingly, high brightness is able to be obtained while reducing the power consumption of the backlight unit, and it is possible to prevent damage to the components due to the high current applied in order to implement high brightness.

The first reflection filter 530 included in the color conversion sheet 500 can reflect light in at least a portion of the wavelength band of the green light. In addition, the wavelength band of the light reflected by the first reflection filter 530 can be determined in consideration of the wavelength band of the light absorbed by the second color conversion layer 520.

Figure 8:
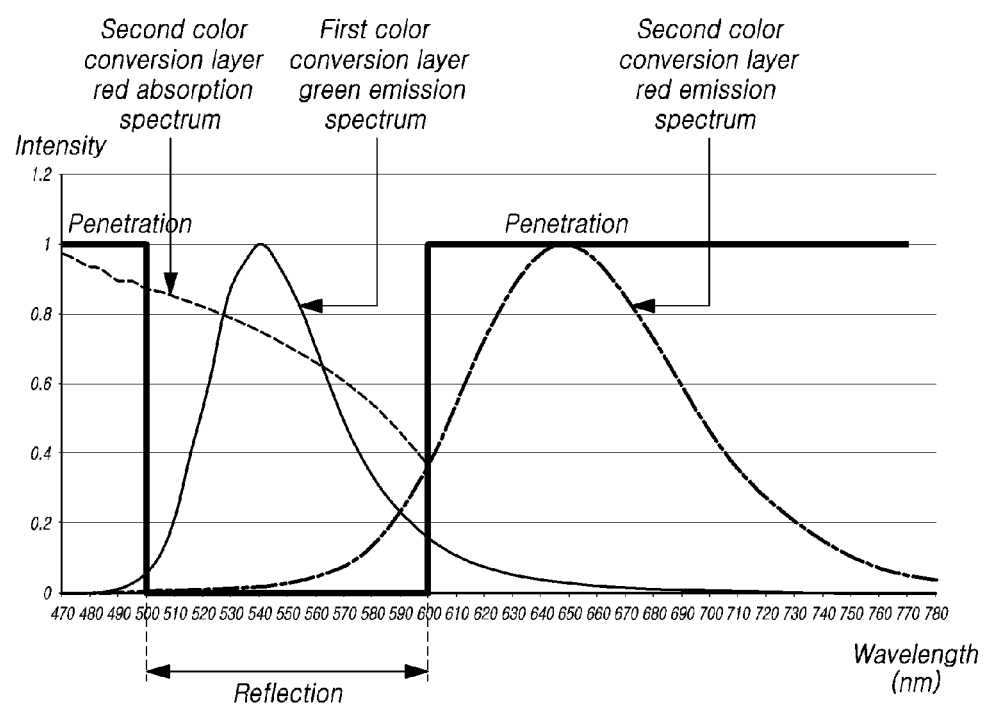
FIG. 8 is a diagram illustrating an example of a reflection spectrum of a first reflection filter included in the color conversion sheet shown in FIG. 7.

FIG. 8 is a diagram illustrating an example of the reflection spectrum of the first reflection filter 530 included in the color conversion sheet 500 shown in FIG. 7. Here, the X-axis represents the wavelength (nm), and the Y-axis represents the intensity. In addition, the intensity can denote the relative ratio of the wavelength of the light absorbed or emitted by the color conversion layer.

FIG. 8 illustrates examples of a spectrum of light emitted by exciting blue light using the first color conversion layer 510 (green light emission spectrum) and a spectrum of light emitted by exciting blue light or green light using the second color conversion layer 520 (red light emission spectrum). In addition, FIG. 8 illustrates an example of the spectrum of light absorbed by the second color conversion layer 520 (red light absorption spectrum).

The light absorption spectrum or the light emission spectrum of the color conversion material is only an example, and there can be some differences in the spectrum depending on the type of the color conversion material.

For example, the first color conversion layer 510 can emit light in a wavelength band corresponding to the green light emission spectrum, and can emit light having a wavelength of about 500 nm to 580 nm. In addition, the second color conversion layer 520 can emit light in a wavelength band corresponding to the red light emission spectrum, and can emit light having a wavelength of about 600 nm to 700 nm.

Here, the second color conversion layer 520 can absorb blue light or green light having a short wavelength, and can emit red light. Accordingly, the wavelength band of the light absorbed by the second color conversion layer 520 can overlap the wavelength band of the light emitted by the first color conversion layer 510.

The first reflection filter 530 interposed between the first color conversion layer 510 and the second color conversion layer 520 can reflect the light in at least a portion of the wavelength band in which the wavelength band of the light emitted from the first color conversion layer 510 overlaps the wavelength band of the light absorbed by the second color conversion layer 520.

For example, the first reflection filter 530 can block the light corresponding to the wavelength band that can be absorbed by the second color conversion layer 520, among the wavelength bands of the light emitted by the first color conversion layer 510. In other words, the first reflection filter 530 can prevent the light emitted from the first color conversion layer 510 from traveling to the second color conversion layer 520.

Accordingly, the first reflection filter 530 is able to prevent the loss of green light, which occurs in the case where the green light excited by the first color conversion layer 510 is absorbed by the second color conversion layer 520. In addition, the first reflection filter 530 can reflect the green light emitted backwards from the first color conversion layer 510 toward the front, so that the proportion of green light supplied to the display panel 110 increases, thereby improving the overall brightness.

The reflection spectrum of the first reflection filter 530 can be variously determined within the wavelength band within which the light emission spectrum of the first color conversion layer 510 overlaps the light absorption spectrum of the second color conversion layer 520.

Figure 9A:
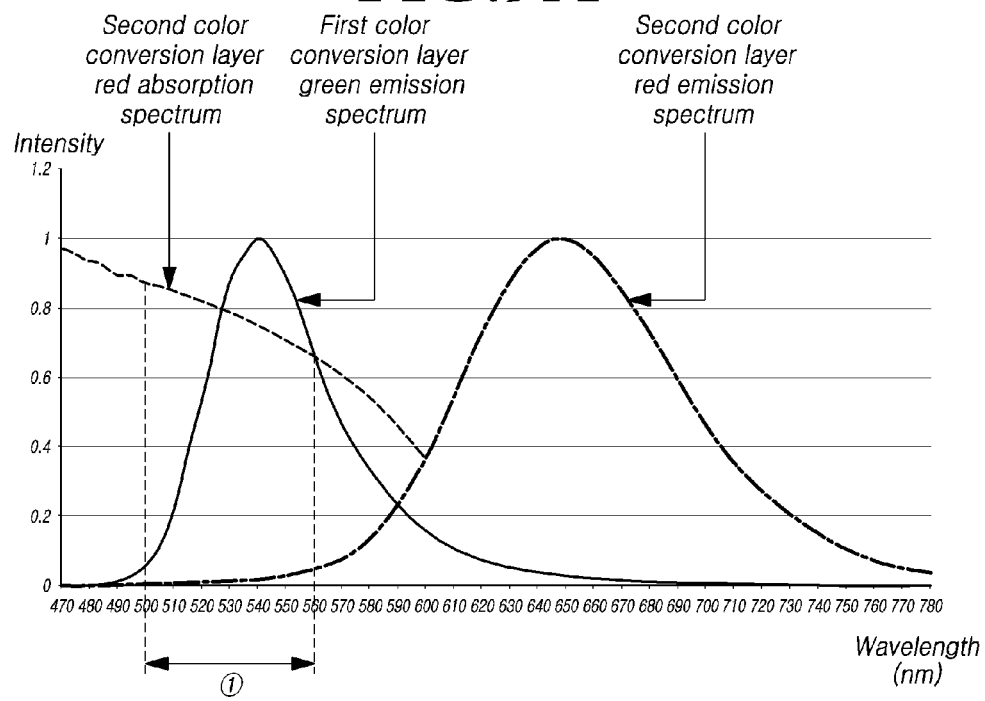
FIGS. 9A to 9C are diagrams illustrating detailed examples of a reflection spectrum of a first reflection filter included in the color conversion sheet shown in FIG. 7.
Figure 9A:
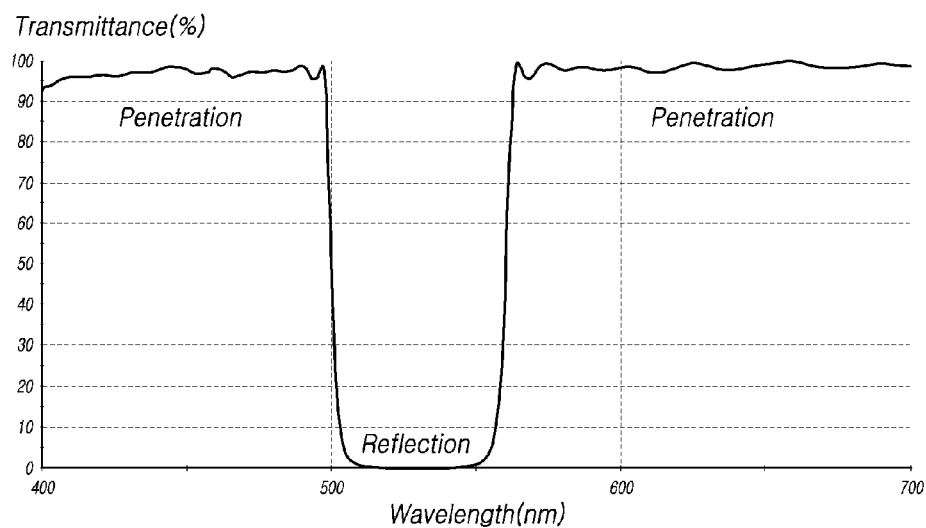
Figure 9B:
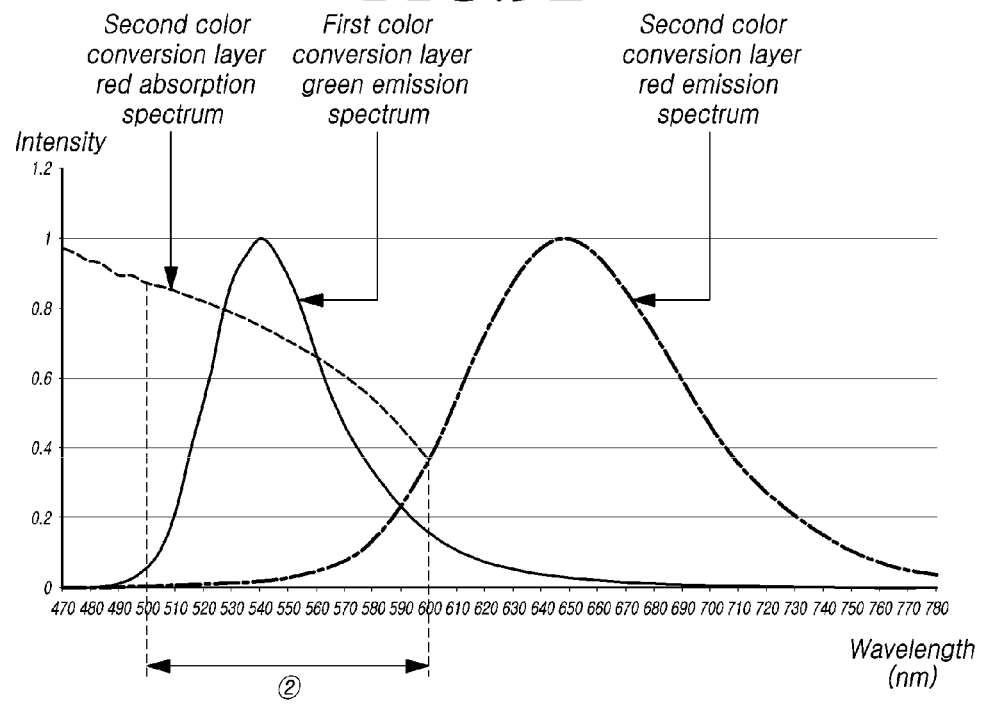
Figure 9B:
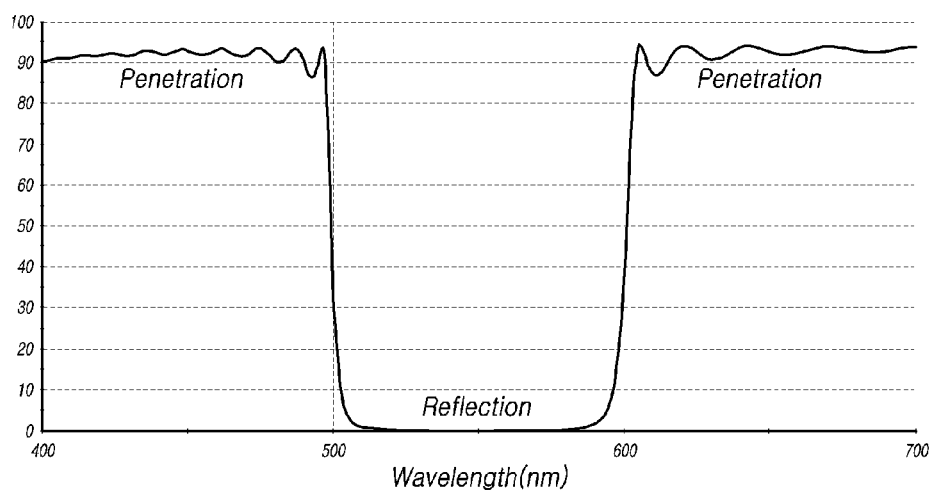
Figure 9C:
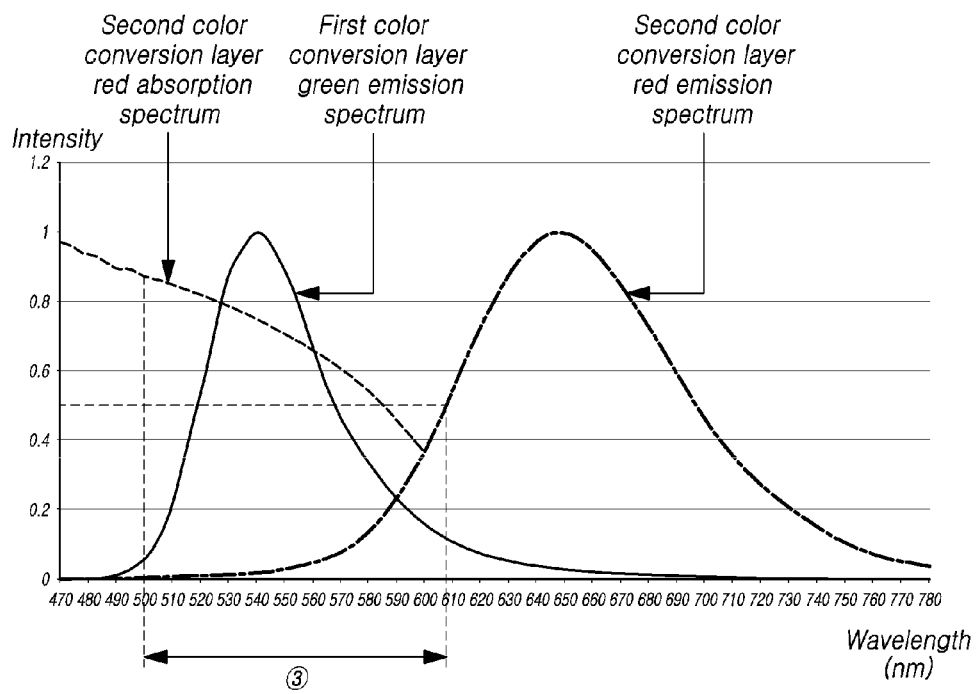
Figure 9C:
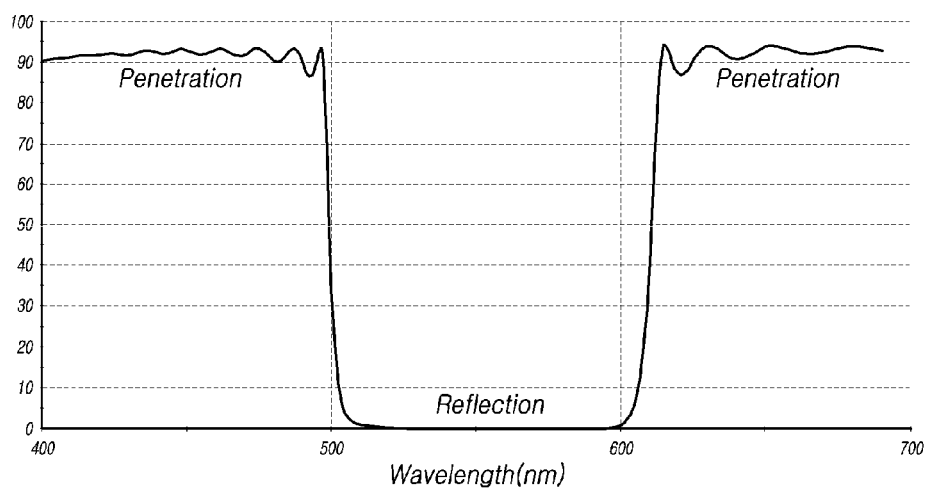

FIGS. 9A to 9C are diagrams illustrating detailed examples of the reflection spectrum of the first reflection filter 530 included in the color conversion sheet 500 shown in FIG. 7.

Referring to FIG. 9A, the first reflection filter 530 can reflect the light, among green light, having a wavelength equal to or less than the wavelength corresponding to the intersection of the spectrum of the light absorbed by the second color conversion layer 520 and the spectrum of the light emitted by the first color conversion layer 510.

For example, the first reflection filter 530 can reflect the light, among green light, having a wavelength equal to or less than 560 nm corresponding to the intersection of the red light absorption spectrum and the green light emission spectrum, as denoted by ① in FIG. 9A.

Accordingly, the first reflection filter 530 can reflect light having a wavelength in the range of 500 nm to 560 nm. In addition, the first reflection filter 530 can transmit light having a wavelength outside of the range of 500 nm to 560 nm therethrough.

For example, as shown in the example as spectrum EX1 of the first reflection filter 530, the first reflection filter 530 can exhibit a reflection spectrum in which light having a wavelength in the range of 500 nm to 560 nm is reflected and light having a wavelength outside of the range of 500 nm to 560 nm passes therethrough.

The first reflection filter 530 can block the light having a wavelength in the range within which the largest amount of light is excited, among the range in which the light emission spectrum of the first color conversion layer 510 overlaps the light absorption spectrum of the second color conversion layer 520, thereby preventing the loss of green light and improving luminance efficiency.

Alternatively, the first reflection filter 530 can reflect the light corresponding to the entire wavelength band in which the light emission spectrum of the first color conversion layer 510 overlaps the light absorption spectrum of the second color conversion layer 520.

Referring to FIG. 9B, the first reflection filter 530 can reflect the light, among green light, having a wavelength equal to or less than the wavelength corresponding to the intersection of the spectrum of the light absorbed by the second color conversion layer 520 and the spectrum of light emitted from the second color conversion layer 520.

For example, the first reflection filter 530 can reflect the light, among green light, having a wavelength equal to or less than 600 nm corresponding to the intersection of the red light absorption spectrum and the red light emission spectrum, as denoted by ② in FIG. 9B.

Accordingly, the first reflection filter 530 can reflect the light having a wavelength in the range of 500 nm to 600 nm, and can transmit the light having a wavelength outside of the range of 500 nm to 600 nm therethrough.

For example, as shown in the example as spectrum EX2 of the first reflection filter 530, the first reflection filter 530 can exhibit a reflection spectrum in which light having a wavelength in the range of 500 nm to 600 nm is reflected and light having a wavelength out of the range of 500 nm to 600 nm passes therethrough.

The first reflection filter 530 can block all of the light having a wavelength absorbed by the second color conversion layer 520, among the wavelength bands of light emitted from the first color conversion layer 510, thereby minimizing the loss of green light emitted from the first color conversion layer 510.

Alternatively, the first reflection filter 530, in some cases, can reflect the light in the broadest wavelength band while avoiding blocking the light emitted from the second color conversion layer 520.

Referring to FIG. 9C, the first reflection filter 530 can reflect green light, and can transmit the light in the wavelength band corresponding to the half-width of the spectrum of the light emitted from the second color conversion layer 520 therethrough.

For example, the first reflection filter 530 can reflect the light, among green light, having a wavelength equal to or less than 608 nm corresponding to the half-width of the red light emission spectrum, as denoted by ③ in FIG. 9C.

Accordingly, as shown in the example as spectrum EX3 of the first reflection filter 530, the first reflection filter 530 can exhibit a reflection spectrum in which light having a wavelength in the range of 500 nm to 608 nm is reflected and light having a wavelength outside of the range of 500 nm to 608 nm passes therethrough.

In order to prevent the absorption of the light emitted from the first color conversion layer 510 by the second color conversion layer 520, the first reflection filter 530 can reflect the light in a wavelength band slightly greater than the wavelength band of the red light absorption spectrum, and can allow the light in a wavelength band corresponding to the half-width of the red light emission spectrum to pass therethrough, thereby preventing the first reflection filter 530 from blocking the red light emitted from the second color conversion layer 520.

As described above, the color conversion sheet 500 according to embodiments of the disclosure can excite the blue light independently using the first color conversion layer 510 and the second color conversion layer 520, and can prevent the green light, which has been excited by the first color conversion layer 510, from being excited by the second color conversion layer 520, thereby minimizing the loss of the green light and improving luminance efficiency.

In addition, the color conversion sheet 500 can further include a reflection filter disposed to reflect the light emitted from the second color conversion layer 520, thereby increasing luminance efficiency and improving color uniformity.

FIG. 10 is a diagram illustrating another example of the structure of a color conversion sheet 500 included in a backlight unit according to embodiments of the present disclosure.

Referring to FIG. 10, a light source 230 disposed on a printed circuit 220 can emit blue light in a first wavelength band. In addition, the blue light emitted from the light source 230 can pass through the color conversion sheet 500 to then be supplied to the display panel 110.

The color conversion sheet 500 can include a first color conversion layer 510 that reacts to blue light, thereby emitting green light in a second wavelength band, and a second color conversion layer 520 that reacts to blue light or green light, thereby emitting red light in a third wavelength band.

The second color conversion layer 520 can be disposed to be distinct from the first color conversion layer 510, and can be disposed to be positioned between the light source 230 and the first color conversion layer 510. In addition, the first reflection filter 530 can be interposed between the first color conversion layer 510 and the second color conversion layer 520.

The first reflection filter 530 can reflect light in a wavelength band in which the wavelength band of green light emitted from the first color conversion layer 510 overlaps the wavelength band of the light absorbed by the second color conversion layer 520.

For example, the first reflection filter 530 can reflect the light in the wavelength band in which the green light emitted from the first color conversion layer 510 is able to be excited into red light by the second color conversion layer 520. Accordingly, it is possible to prevent loss of the green light emitted from the first color conversion layer 510 and increase the amount of green light supplied to the display panel 110.

In addition, the color conversion sheet 500 can further include a second reflection filter 540 positioned between the light source 230 and the second color conversion layer 520.

The second reflection filter 540 can reflect the red light emitted from the second color conversion layer 520, and can transmit the light in the wavelength bands, excluding the wavelength band of the red light, therethrough.

Accordingly, the second reflection filter 540 can transmit the blue light emitted from the light source 230 therethrough, and can reflect the red light emitted backwards from the second color conversion layer 520. In addition, the second reflection filter 540 reflects the red light emitted backwards toward the front thereof, thereby increasing the amount of light supplied to the display panel 110.

For example, the second reflection filter 540 can reflect the green light and the red light emitted backwards toward the front while preventing the excitation of green light into red light, thereby improving the overall brightness while increasing the proportion of green light.

In addition, it is possible to provide a uniform color in the area around the light source 230 by positioning the point where green light is reflected adjacent to the point where red light is reflected.

For example, if the second reflection filter 540 is not provided, the green light emitted backwards from the first color conversion layer 510 can be reflected by the first reflection filter 530 included in the color conversion sheet 500 to then travel forwards. In addition, the red light emitted backwards from the second color conversion layer 520 can reach the reflection plate 240 on the printed circuit 220, and can then be reflected toward the front thereof.

Accordingly, there can be a difference in the reflection points between the red light and the green light emitted backwards from the color conversion sheet 500.

On the other hand, in the case where the second reflection filter 540 is provided, since the red light and the green light emitted backwards are reflected in the color conversion sheet 500, it is possible to impart a uniform color to the light radiated from the color conversion sheet 500 through a configuration whereby that the reflection point of the red light and the reflection point of the green light are close to each other.

As described above, it is possible to improve overall color uniformity while preventing the loss of red light and improving luminance efficiency by including the second reflection filter 540 beneath the color conversion sheet 500.

According to the embodiments of the present disclosure described above, the light conversion patterns 310 can be provided in areas corresponding to the light sources 230 included in the backlight unit to prevent hot spots, thereby achieving desired image quality while reducing the thickness of the backlight unit.

In addition, the color conversion sheet 500 can independently excite green light and red light in order to realize white light, and can prevent the excitation of the green light into red light, thereby increasing overall brightness while preventing the loss of green light. Accordingly, the backlight unit is able to be implemented to have improved luminance efficiency and a small thickness while achieving the image quality.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. For example, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device comprising:
   a display panel; and
   a backlight unit configured to supply light to the display panel,
   wherein the backlight unit comprises:
   a plurality of light sources configured to emit light in a first wavelength band; and
   a color conversion sheet arranged between the light sources and the display panel, and
   wherein the color conversion sheet comprises:
   a first color conversion layer configured to react to the light in the first wavelength band and emit light in a second wavelength band;
   a second color conversion layer positioned between the light sources and the first color conversion layer, and configured to react to the light in at least a portion of the first wavelength band and the second wavelength band and emit light in a third wavelength band; and
   a first reflection filter positioned between the first color conversion layer and the second color conversion layer, and configured to separate the first color conversion layer from the second color conversion layer and reflect the light in at least a portion of the second wavelength band.

2. The display device of claim 1, wherein the first reflection filter is configured to reflect the light in at least a portion of the wavelength band in which the wavelength band of the light absorbed by the second color conversion layer overlaps the second wavelength band.

3. The display device of claim 1, wherein the first reflection filter is configured to reflect light having a wavelength, in the second wavelength band, equal to or less than a wavelength corresponding to an intersection of a spectrum of the light absorbed by the second color conversion layer and a spectrum of the light emitted from the first color conversion layer.

4. The display device of claim 1, wherein the first reflection filter is configured to reflect light having a wavelength, in the second wavelength band, equal to or less than a wavelength corresponding to an intersection of a spectrum of the light absorbed by the second color conversion layer and a spectrum of the emitted from the second color conversion layer.

5. The display device of claim 1, wherein the first reflection filter is configured to transmit light in wavelength bands, excluding the second wavelength band, therethrough.

6. The display device claim 1, wherein the first reflection filter is configured to transmit light in a wavelength band corresponding to a half-width of a spectrum of the light emitted from the second color conversion layer.

7. The display device of claim 1, wherein the color conversion sheet further comprises a second reflection filter positioned between the light sources and the second color conversion layer and configured to reflect the light in the third wavelength band.

8. The display device of claim 1, wherein a peak wavelength in a spectrum of the light emitted from the first color conversion layer is less than a peak wavelength in a spectrum of the emitted from the second color conversion layer.

9. The display device of claim 1, further comprising:
   a light source protector disposed on the light sources and a reflection plate; and a transparent film disposed between the light source protector and the color conversion sheet and having a plurality of light conversion patterns arranged on at least one of upper and lower surfaces thereof, wherein respective ones of the plurality of light conversion patterns are arranged to correspond to respective ones of the light sources.

10. The display device of claim 9, wherein the light conversion patterns are arranged in a single-layered structure or a multi-layered structure on a lower surface of the transparent film.

11. The display device of claim 10, wherein the area of the light conversion patterns is reduced downwards from the transparent film, and the thickness of the central area of the light conversion patterns is greater than the thickness of the peripheral area of the light conversion patterns in case that the light conversion patterns are arranged in the multi-layered structure.

12. The display device of claim 9, wherein the light conversion patterns are arranged so that the thickness of the light conversion patterns disposed in the peripheral area of the backlight unit is smaller than that of the light conversion patterns disposed in the central area thereof of the backlight unit.

13. The display device of claim 9, wherein the light conversion patterns are arranged so that the thickness of the light conversion patterns is gradually decreases from the central area of the backlight unit to the peripheral area of the backlight unit.

14. The display device of claim 9, wherein the light conversion patterns are arranged so that the size of the light conversion patterns disposed in the peripheral area of the backlight unit is smaller than that of the light conversion patterns disposed in the central area thereof of the backlight unit.

15. The display device of claim 9, wherein the light conversion patterns are arranged so that the size of the light conversion patterns is gradually decreases from the central area of the backlight unit to the peripheral area of the backlight unit.

16. The display device of claim 9, wherein the light conversion patterns are arranged so that the number of the light conversion patterns or the distance between of the light conversion patterns are different between the central area of the backlight unit and the peripheral area of the backlight unit.

17. The display device of claim 9, further comprising an adhesive layer disposed in at least some of areas, excluding areas in which the light conversion patterns are arranged, between the light source protector and the transparent film so as to be spaced apart from the light conversion pattern, wherein an air gap is provided between the light source protector and the light conversion pattern.

18. A color conversion sheet comprising:

a first color conversion layer configured to react to light in a first wavelength band, and emit light in a second wavelength band;

a second color conversion layer configured to react to light in at least a portion of the first wavelength band and the second wavelength band, and emit light in a third wavelength band; and a reflection filter positioned between the first color conversion layer and the second color conversion layer, and configured to separate the first color conversion layer from the second color conversion layer and reflect light in at least a portion of the second wavelength band and transmit light in at least a portion of the third wavelength band, wherein a peak wavelength in a spectrum of the light emitted from the first color conversion layer is less than a peak wavelength in a spectrum of the light emitted from the second color conversion layer.

19. The color conversion sheet of claim 18, wherein the reflection filter is configured to reflect light in at least a portion of the wavelength band in which the wavelength band of the light absorbed by the second color conversion layer overlaps the second wavelength band.

\* \* \* \* \*